(12) United States Patent
Grant et al.

(10) Patent No.: US 11,095,344 B2
(45) Date of Patent: *Aug. 17, 2021

(54) EFFICIENT SPATIAL RELATION INDICATION FOR PHYSICAL UPLINK CONTROL CHANNEL (PUCCH) RESOURCES

(71) Applicant: Telefonaktiebolaget LM Ericsson (publ), Stockholm (SE)

(72) Inventors: Stephen Grant, Pleasanton, CA (US); Sebastian Faxér, Järfälla (SE); Mattias Frenne, Uppsala (SE); Siva Muruganathan, Stittsville (CA); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,153

(22) Filed: Aug. 25, 2020

(65) Prior Publication Data

US 2020/0389210 A1   Dec. 10, 2020

Related U.S. Application Data

(63) Continuation of application No. 16/344,995, filed as application No. PCT/SE2019/050248 on Mar. 19, 2019, now Pat. No. 10,790,882.

(Continued)

(51) Int. Cl.
*H04B 7/02* (2018.01)
*H04B 7/0417* (2017.01)
(Continued)

(52) U.S. Cl.
CPC ......... *H04B 7/0417* (2013.01); *H04B 7/0617* (2013.01); *H04B 7/0619* (2013.01);
(Continued)

(58) Field of Classification Search
CPC .... H04B 7/0417; H04B 7/088; H04B 7/0619; H04B 7/0617; H04B 7/0695;
(Continued)

(56) References Cited

U.S. PATENT DOCUMENTS 9,780,936 B2   10/2017   Lee et al.
10,863,570 B2 *  12/2020   Cirik .................... H04B 7/0695
(Continued)

FOREIGN PATENT DOCUMENTS

KR   101838284 B1   3/2018
RU    2530326 C2   10/2014

OTHER PUBLICATIONS

"3GPP TS 23.501 V15.4.0", 3rd Generation Partnership Project; Technical Specification Group Services and System Aspects; System Architecture for the 5G System; Stage 2 (Release 15), Dec. 2018, pp. 1-236.
(Continued)

*Primary Examiner* — Don N Vo
(74) *Attorney, Agent, or Firm* — Murphy, Bilak & Homiller, PLLC

(57) ABSTRACT

Exemplary embodiments include methods for a network node to receive PUCCH transmissions by a user equipment (UE). Embodiments include sending, to the UE, a control message comprising: 1) identification of a first spatial relation of a plurality of spatial relations configured for the UE, wherein the plurality of spatial relations are associated with one or more reference signals (RS) transmitted by the network node or by the UE; and 2) an indication of whether the first spatial relation applies to a single PUCCH resource or at least one group of PUCCH resources configured for the UE. Embodiments also include receiving, from the UE, a PUCCH message transmitted according to the first spatial relation using a PUCCH resource, configured for the UE, to
(Continued)

which the first spatial relation applies. Embodiments also include complementary methods performed by a UE, as well as network nodes and UEs configured to perform such methods.

14 Claims, 6 Drawing Sheets

Related U.S. Application Data

(60) Provisional application No. 62/649,012, filed on Mar. 28, 2018.

(51) Int. Cl.
*H04B 7/06* (2006.01)
*H04B 7/08* (2006.01)
*H04L 5/00* (2006.01)
*H04W 72/04* (2009.01)

(52) U.S. Cl.
CPC .......... *H04B 7/0695* (2013.01); *H04B 7/088* (2013.01); *H04L 5/0048* (2013.01); *H04L 5/0053* (2013.01); *H04L 5/0094* (2013.01); *H04W 72/0413* (2013.01)

(58) Field of Classification Search
CPC ... H04L 5/0048; H04L 5/0053; H04L 5/0094; H04W 72/0413
USPC ......................................... 375/262, 267, 299
See application file for complete search history.

(56) References Cited

U.S. PATENT DOCUMENTS

| | | |
|---|---|---|
| 2011/0243066 A1 | 10/2011 | Nazar et al. |
| 2013/0003700 A1 | 1/2013 | Zhang et al. |
| 2019/0149365 A1 | 5/2019 | Chatterjee et al. |
| 2019/0174466 A1 | 6/2019 | Zhang et al. |
| 2019/0190582 A1 | 6/2019 | Guo et al. |
| 2019/0296805 A1* | 9/2019 | Son .................. H04W 76/27 |
| 2020/0389883 A1* | 12/2020 | Faxer ................ H04L 5/0048 |

OTHER PUBLICATIONS

"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.
"3GPP TS 38.401 V15.4.0", 3rd Generation Partnership Project; Technical Specification Group Radio Access Network; NG-RAN; Architecture description (Release 15), Dec. 2018, pp. 1-40.
"RAN1 Chairman's Notes", 3GPP TSG RAN WG1 Meeting 91; Reno, USA, Nov. 27-Dec. 1, 2017, pp. 1-185.
"3GPP TS 38.331 V15.0.0"; 3rd Generation Partnership Project; Technical Specification Group Radio Access Network NR Radio Resource Control (RRC) protocol specification (Release 15), Dec. 2017, pp. 1-188.
"3GPP TS 38.321 V15.0.0"; 3rd Generation Partnership Project; Technical Specification Group Radio Access Network; NR; Medium Access Control (MAC) protocol specification (Release 15), Dec. 2017, pp. 1-55.
"3GPP TS 38.213 V15.0.0"; 3rd Generation Partnership Project; Technical Specification Group Radio Access Network; NR; Physical layer procedures for control (Release 15), Dec. 2017, pp. 1-56.
"3GPP TR 38.801 V14.0.0"; 3rd Generation Partnership Project; Technical Specification Group Radio Access Network; Study on new radio access technology: Radio access architecture and interfaces (Release 14), Mar. 2017, pp. 1-91.
"Ambiguities about beam indication and aperiodic CSI-RS triggering offset configuration in some cases", 3GPP TSG RAN WG1 Meeting #92; R1-1801892; Athens, Greece, Feb. 26-Mar. 2, 2018, pp. 1-9.
"Introduction of MAC CEs for NR MIMO", 3GPP TSG-RAN WG2 #101; R2-1803796; Athens, Greece, Feb. 26-Mar. 2, 2018, pp. 1-11.
"On PUCCH Resource Allocation and Other Issues", 3GPP TSG RAN WG1 Meeting AH 1801; R1-1800950; Vancouver, Canada, Jan. 22-26, 2018, pp. 1-8.
"Remaining Details of beam management", 3GPP TSG RAN WG1 Meeting #92bis; R1-1804974; Sanya, China, Apr. 16-20, 2018, pp. 1-8.

* cited by examiner

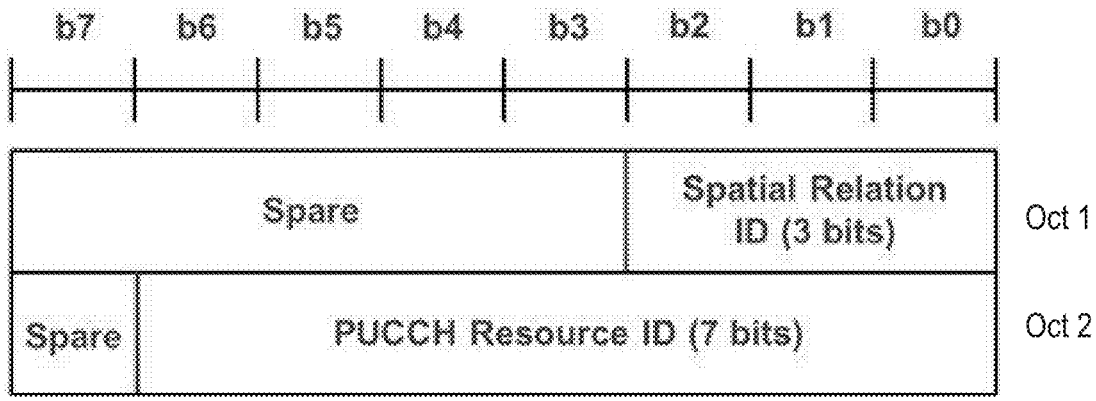
FIG. 2
| PUCCH Resource ID Field in MAC-CE | Actual PUCCH Resource ID |
|---|---|
| 0 0 0 0 0 0 0 | Spatial Relation applied to all PUCCH Resources (ID 0 – 126) |
| 0 0 0 0 0 0 1 | ID 0 |
| 0 0 0 0 0 1 0 | ID 1 |
| 0 0 0 0 0 1 1 | ID 2 |
| ⋮ | ⋮ |
| 1 1 1 1 1 1 1 | ID 126 |
FIG. 3
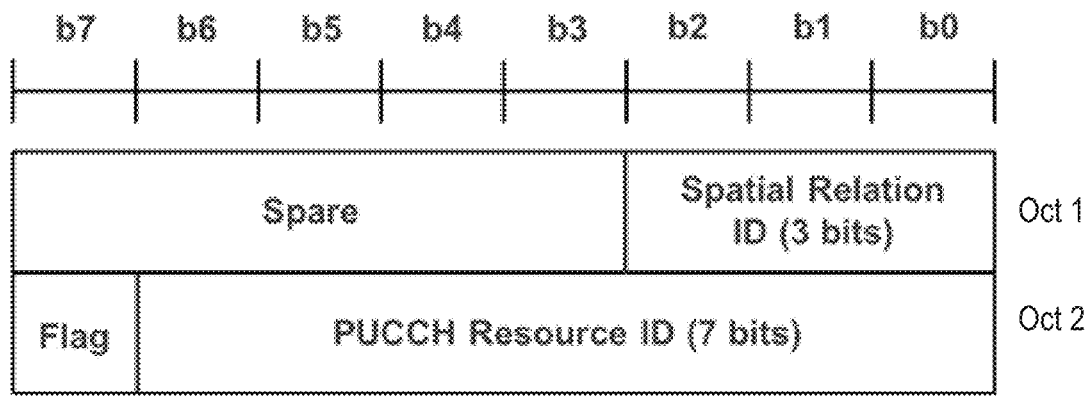
FIG. 4

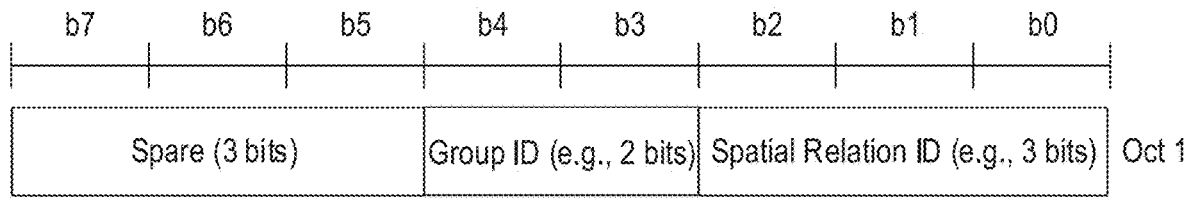
*FIG. 5*
| Spatial Group ID | PUCCH Resource IDs contained in the Spatial Group |
|---|---|
| 0 | 0 – 31 |
| 1 | 32 – 63 |
| 2 | 64 – 95 |
| 3 | 96 – 127 |
*FIG. 6*
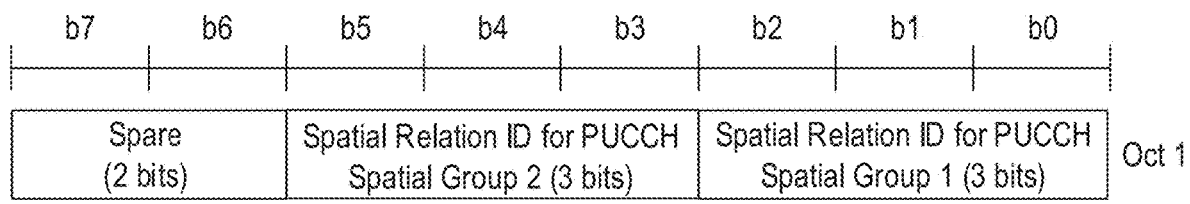
*FIG. 7*

EFFICIENT SPATIAL RELATION INDICATION FOR PHYSICAL UPLINK CONTROL CHANNEL (PUCCH) RESOURCES

CROSS-REFERENCE TO RELATED APPLICATION(S)

This application is a continuation of, and claims the benefit of priority from, U.S. patent application Ser. No. 16/344,995 filed on Apr. 25, 2019, which is a U.S. national-stage application claiming priority to international application PCT/SE2019/050248 filed on Mar. 19, 2019, which claims the benefit of U.S. Provisional Patent Application 62/649,012 filed on Mar. 28, 2018. The entire disclosures of the above-mentioned applications are incorporated herein by reference for all purposes.

TECHNICAL FIELD

The present invention generally relates to wireless communication networks, and particularly relates to efficient configuration of spatial relations for Physical Uplink Control Channel (PUCCH) resources used in communication between a user equipment (UE) and a network node in a wireless communication network.

BACKGROUND

Wireless communication has evolved rapidly in the past decades as a demand for higher data rates and better quality of service has been continually required by a growing number of end users. Next-generation (so-called "5G") cellular systems are expected to operate at higher frequencies (e.g., millimeter-wavelength or "mmW") such as 5-300 GHz. Such systems are also expected to utilize a variety of multi-antenna technology (e.g., antenna arrays) at the transmitter, the receiver, or both. In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In various wireless communication systems, such as cellular systems, there can be fewer constraints on the complexity of the base station (also referred to herein as network node, NodeB (NB), and evolved NodeB (eNB), and next-generation NodeB (gNB)) compared to the terminal (also referred to herein as user equipment (UE), wireless communication device, and mobile unit). In such exemplary cases, a transmit diversity may be feasible in the downlink (i.e., base station to terminal) only and, in fact, may provide a way to simplify the receiver in the terminal. In the uplink (i.e., terminal to base station) direction, due to a complexity of multiple transmit antennas, it may be preferable to achieve diversity by using a single transmit antenna in the terminal multiple receive antennas at the base station. Nevertheless, it is expected that in 5G systems, certain operating configurations will utilize multiple antennas at both the terminal and the base station.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. In general, beamforming can increase the signal strength at the receiver in proportion to the number of transmit antennas. Beamforming can be based either on high or low fading correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

In order to achieve these performance gains, MIMO generally provides that both the transmitter and receiver have knowledge of the channel from each transmit antenna to each receive antenna. In some exemplary embodiments, this can be done by the receiver measuring the amplitude and phase of a known transmitted data symbol (e.g., a pilot symbol and/or reference symbol/signal) and sending these measurements to the transmitter as "channel state information" (CSI). CSI can include, for example, amplitude and/or phase of the channel at one or more frequencies, amplitude and/or phase of time-domain multipath components of the signal via the channel, direction of arrival of multipath components of the signal via the channel, and other direct channel measurements known by persons of ordinary skill. Alternately, or in addition, CSI can include a set of transmission parameters recommended for the channel based on one or more channel measurements.

As used herein, "multipath component" can describe any resolvable signal component arriving at a receiver or incident on an antenna array at the receiver. The multipath component can be processed by the receiver at the radio frequency (RF), after conversion to an intermediate frequency (IF), or after conversion to baseband (i.e., zero or near-zero frequency). A plurality of the multipath components can comprise a main component of a transmitted signal received via a primary, direct, or near-direct path from the transmitter to the receiver, as well as one or more secondary components of the transmitted signal received via one or more secondary paths involving reflection, diffraction, scattering, delay, attenuation, and/or phase shift of the transmitted signal. Persons of ordinary skill can recognize that the number and characteristics of the multipath components available to be processed by a receiver can depend on various factors including, e.g., transmit and receive antennas, channel and/or propagation characteristics, transmission frequencies, signal bandwidths, etc.

In the case of a transmit array comprising $N_T$ antennas and a receive array comprising $N_R$ antennas, the receiver can be used to send CSI for $N_T \cdot N_R$ channels to the transmitter. Moreover, in mobile communication environments, these $N_T \cdot N_R$ channels are likely not stationary but vary according to the relative motion between the transmitter and the receiver (e.g., base station and terminal). The rate of change of the channel—and thus the preferable CSI update rate—can be proportional to the relative velocity between the transmitter and the receiver, and to the carrier frequency of the signal being transmitted. Further mobile communication systems—including 5G systems—can utilize mmW frequencies in the 5-300 GHz spectrum, which are substantially higher than the 1-5 GHz spectrum used by today's systems. In addition, increasing the numbers antennas (i.e., $N_T$ and/or $N_R$) is expected to be an important technique for achieving performance goals for 5G systems including high data rates. In fact, as such mmW systems evolve, both the base stations and terminals could potentially utilize a multitude of antenna elements each, with the actual number of elements limited only by the physical area and/or volume available in each particular application.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands, including the 700-MHz band in the United States. LTE is accompanied by improvements to non-radio aspects commonly referred to as System Architecture Evolution (SAE), which includes Evolved Packet Core (EPC) network.

A feature added in LTE Rel-10 (Rel-10) is support for bandwidths larger than 20 MHz, while remaining backward compatible with Rel-8. As such, a wideband (e.g., >20 MHz) LTE Rel-10 carrier should appear as a number of component carriers (CCs) to an LTE Rel-8 terminal. For an efficient use of a wideband Rel-10 carrier, legacy (e.g., Rel-8) terminals can be scheduled in all parts of the wideband LTE Rel-10 carrier. One way to achieve this is by means of Carrier Aggregation (CA), whereby an LTE Rel-10 UE can receive multiple CCs, each preferably having the same structure as a Rel-8 carrier.

Each of the CCs allocated to a UE also corresponds to a cell. In particular, the UE is assigned a primary serving cell (PCell) as the "main" cell serving the UE. Both data and control signaling can be transmitted over the PCell, which is always activated. In addition, the UE can be assigned one or more supplementary or secondary serving cells (SCells) that are typically used for transmitting and/or receiving data only. For example, the Scell(s) can provide extra bandwidth to enable greater data throughput, and can be activated or deactivated dynamically.

While LTE was primarily designed for user-to-user communications, 5G cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

The large variety of requirements for the next generation of mobile communications system (5G or NR) implies that frequency bands at many different carrier frequencies will be needed. For example, low bands will be needed to achieve sufficient coverage and higher bands (e.g. mmW, i.e. near and above 30 GHz) will be needed to reach the required capacity. At mmW frequencies the propagation properties are more challenging and high gain beamforming at the base station is required to achieve sufficient link budget.

At mmW frequencies, concepts for handling mobility between beams (both within and between TRPs) have been specified in NR. At these frequencies, where high-gain beamforming can be used, each beam is only optimal within a small area, and the link budget outside the optimal beam deteriorates quickly. Hence, frequent and fast beam switching can be necessary to maintain high performance. To support such beam switching, a beam indication framework has been specified in NR. For example, for downlink data transmission (PDSCH), the downlink control information (DCI) contains a transmission configuration indicator (TCI) that informs the UE which transmit beam is used so that it can adjust its receive beam accordingly. This is beneficial for the case of analog Rx beamforming where the UE needs to determine and apply the Rx beamforming weights before it can receive the PDSCH.

As used herein, the terms "spatial filtering weights" and "spatial filtering configuration" can refer to antenna weights that are applied at either the transmitter (gNB or UE) or the receiver (UE or gNB) for transmission/reception of data and/or control information. These terms are general in the sense that different propagation environments can lead to different spatial filtering weights that match the transmission/reception of a signal to the channel. The spatial filtering weights may not always result in a beam in a strict sense.

Prior to data transmission, a training phase is required in order to determine the gNB and UE spatial filtering configurations, referred to as DL beam management in NR terminology. This is illustrated in FIG. 1, which shows an exemplary beam training phase follows by a data transmission phase utilizing the results of the training phase. In NR, two types of reference signals (RSs) are used for DL beam management operations: channel state information RS (CSI-RS) and synchronization signal/physical broadcast control channel (SS/PBCH) block, or SSB for short. FIG. 1 shows an example where CSI-RS is used to find an appropriate beam pair link (BPL), meaning a suitable gNB transmit spatial filtering configuration (gNB Tx beam) plus a suitable UE receive spatial filtering configuration (UE Rx beam) resulting in sufficiently large link budget.

As shown in FIG. 1, in the gNB Tx beam sweep, the gNB configures the UE to measure on a set of five (5) CSI-RS resources (RS1 . . . RS5) that are transmitted with five (5) different spatial filtering configurations (e.g., Tx beams). The UE can also be configured to report back the RS ID and the reference-signal receive power (RSRP) of the CSI-RS corresponding to the maximum measured RSRP. In the example shown in FIG. 1, the maximum measured RSRP corresponds to RS4. In this way, the gNB can learn the preferred Tx beam from the UE perspective.

In the subsequent UE Rx beam sweep, the gNB can transmit a number of CSI-RS resources in different OFDM symbols, all with the same spatial filtering configuration (e.g., Tx beam) that was used to transmit RS4 previously. The UE then tests a different Rx spatial filtering configuration (Rx beam) in each OFDM symbol to identify the largest received RSRP. The UE remembers the RS ID (RS ID 6 in this example) and the corresponding spatial filtering configuration that resulted in the largest RSRP. The network can then refer to this RS ID in the future when DL data is scheduled to the UE, thus allowing the UE to adjust its Rx spatial filtering configuration (e.g., Rx beam) to receive the PDSCH. As mentioned above, the RS ID is contained in a transmission configuration indicator (TCI) that is carried in a field in the DCI that schedules the PDSCH.

In 3GPP NR standards, the term "spatial quasi co-location" (spatial QCL for short) is used to refer to a relationship between the antenna port(s) of two different DL reference signals (RSs) that are transmitted by the gNB. If two transmitted DL RSs are spatially QCL'd at the UE receiver, then the UE may assume that the first and second RSs are transmitted with approximately the same Tx spatial filter configuration. Based on this assumption, the UE can use approximately the same Rx spatial filter configuration to receive the second reference signal as it used to receive the first reference signal. In this way, spatial QCL is a term that assists in the use of analog beamforming and formalizes the notion of "same UE Rx beam" over different time instances.

Referring to the downlink data transmission phase illustrated in FIG. 1, the gNB indicates to the UE that the PDSCH DMRS is spatially QCL'd with RS6. This means that the UE may use the same Rx spatial filtering configuration (Rx beam) to receive the PDSCH as the preferred spatial filtering configuration (Rx beam) determined based on RS6 during the UE beam sweep in the DL beam management phase.

While spatial QCL refers to a relationship between two different DL RSs from a UE perspective, the term "spatial relation" is used, within 3GPP NR standardization, to refer to a relationship between an UL RS (PUCCH/PUSCH DMRS) and another RS, which can be either a DL RS (CSI-RS or SSB) or an UL RS (SRS). Like QCL, this term is also defined from a UE perspective. If the UL RS is spatially related to a DL RS, it means that the UE should transmit the UL RS in the opposite (reciprocal) direction from which it received the second RS previously. More precisely, the UE should apply substantially the same Tx spatial filtering configuration for the transmission of the first RS as the Rx spatial filtering configuration it used to receive the second RS previously. If the second RS is an uplink RS, then the UE should apply the same Tx spatial filtering configuration for the transmission of the first RS as the Tx spatial filtering configuration it used to transmit the second RS previously.

Referring to the uplink data transmission phase illustrated in FIG. 1, the gNB indicates to the UE that the Physical Uplink Control Channel (PUCCH) DMRS is spatially related to RS6. This means that the UE should use the "same" Tx spatial filtering configuration (Tx beam) to transmit the PUCCH DMRS as the preferred Rx spatial filtering configuration (Rx beam) determined based on RS6 during the UE beam sweep in the DL beam management phase. 3GPP Technical Specifications (TS) 38.213 and 38.331 specify that, for NR, a UE can be configured via Radio Resource Control (RRC) protocol with a list of up to eight (8) spatial relations for PUCCH. This list is given by the RRC parameter PUCCH_SpatialRelationInfo. For example, the list would typically contain the IDs of a number of SSBs and/or CSI-RS resources used for the purposes of DL beam management. Alternatively, if SRS-based UL beam management is employed in the network, then the list may also contain the IDs of a number of SRS resources.

Based on the DL (UL) beam management measurements performed by the UE (gNB), the gNB selects one of the RS IDs from the list of configured ones in PUCCH_SpatialRelationInfo. The selected spatial relation can be indicated via a MAC-CE message signaled to the UE for a given PUCCH resource. The UE can then use the signaled spatial relation for the purposes of adjusting the Tx spatial filtering configuration for the transmission on that PUCCH resource.

While the precise MAC-CE message format has not been specified in MAC protocol specification 3GPP TS 38.321 V15.0.0, it was agreed in meeting RAN1 #91 that the relevant MAC-CE message contains: (1) the ID of the PUCCH resource; and (2) an indicator of which of the eight (8) configured spatial relations in PUCCH_SpatialRelationInfo is selected. In general, MAC-CE messages are octet aligned, such that they include an integer number of octets (i.e., 8-bit bytes). Assuming a maximum of 128 configured PUCCH resources, seven (7) bits are needed to indicate the PUCCH resource ID. Assuming a maximum of 8 spatial relations are configured, a minimum of three (3) bits are needed to indicate the selected spatial relation.

In some situations, the network (e.g., a gNB) needs to update the spatial relations of the PUCCH resources. This can require transmitting a MAC CE message for each of the configured PUCCH resources, i.e., up to 128 MAC CE messages. Although this allows for maximum flexibility that can be beneficial in some scenarios, this degree of flexibility is not needed in other scenarios. In fact, in these other scenarios, there can be significant redundancy in these individualized MAC CE messages, leading to waste of resources in downlink signaling channels carrying the MAC CE messages. According, there is a need for an efficient and flexible signaling approach for PUCCH spatial relation indication that supports at least these various scenarios outlined above.

SUMMARY

Embodiments of the present disclosure provide specific improvements to communication between user equipment (UE) and network nodes in a wireless communication network, such as by facilitating solutions to overcome the exemplary problems described above. More specifically, exemplary embodiments can provide an efficient technique to signal a spatial relation for Physical Uplink Control Channel (PUCCH) resources (e.g., via a MAC-CE message) to be used by the UE when communicating with the network node. For example, such techniques can flexibly signal whether a spatial relation should apply to a single PUCCH resource, or to a plurality of PUCCH resources, such as to all configured PUCCH resources or to a group, set, and/or subset of all configured PUCCH resources. When used in NR UEs and network nodes supporting PUCCH spatial relation functionality, these exemplary embodiments can provide various improvements, benefits, and/or advantages including reduced signaling overhead in both downlink and uplink; reduced delay in signaling PUCCH spatial relations for multiple resources; better support for decoupled uplink/downlink implementations; and reduced energy consumption for transmission and/or reception of PUCCH messages.

Exemplary embodiments of the present disclosure include methods and/or procedures for configuring PUCCH resources usable in communication with a user equipment (UE) in a wireless communication network. These exemplary methods and/or procedures can be performed by a network node (e.g., base station, eNB, gNB, ng-eNB, en-gNB, etc., or component thereof) in a wireless communication network.

In some embodiments, the exemplary methods and/or procedures can include performing a training procedure, with the UE, to determine the plurality of spatial relations between a plurality of PUCCH resources and one or more reference signals (RS) transmitted by the UE or by the network node. For example, the one or more RS can include a downlink (DL) RS (e.g., CSI-RS or SSB) or uplink (UL) RS (e.g., SRS).

The exemplary methods and/or procedures also include sending, to the UE, one or more control messages comprising: 1) configuration of a plurality of PUCCH resources; and 2) identification of a plurality of spatial relations associated with the one or more RS. In some embodiments, the configured PUCCH resources can be arranged into a plurality of predetermined groups, with each group comprising a plurality of the configured PUCCH resources. For example, the predetermined group arrangement can be understood by the network node and the UE without explicit communication. In other embodiments, the one or more control messages can also include identification of a plurality of groups of the configured PUCCH resources, with each group comprising a plurality of the configured PUCCH resources.

The exemplary methods and/or procedures can also include sending, to the UE, a further control message comprising: 1) identification of a first spatial relation of the plurality of spatial relations; and 2) an indication of whether the first spatial relation applies to a single PUCCH resource of the configured PUCCH resources, or to at least one group of PUCCH resources of the configured PUCCH resources. In some exemplary embodiments, the further control message can also include a resource identifier that identifies a particular configured PUCCH resource, or a particular group of configured PUCCH resources, to which the first spatial relation applies. In some embodiments, an indication that the first spatial relation applies to all of the configured PUCCH resources can be an absence of any such resource identifiers in the further control message.

In some embodiments, the exemplary methods and/or procedures can also include receiving, from the UE, a PUCCH message transmitted according to the first spatial relation using a configured PUCCH resource to which the first spatial relation applies.

Other exemplary embodiments of the present disclosure include methods and/or procedures for configuring Physical Uplink Control Channel (PUCCH) resources usable in communication with a user equipment (UE) in a wireless communication network. These exemplary methods and/or procedures can be performed by UE (or component thereof) in communication with a network node (e.g., base station, eNB, gNB, ng-eNB, en-gNB, etc., or component thereof) in a wireless communication network.

In some embodiments, the exemplary methods and/or procedures can include performing a training procedure, with the network node, to determine the plurality of spatial relations between a plurality of PUCCH resources and one or more reference signals (RS) transmitted by the UE or by the network node. For example, the one or more RS can include a downlink (DL) RS (e.g., CSI-RS or SSB) or uplink (UL) RS (e.g., SRS).

The exemplary methods and/or procedures can also include receiving, from the network node, one or more control messages comprising: 1) configuration of a plurality of PUCCH resources; and 2) identification of a plurality of spatial relations associated with the one or more RS. In some embodiments, the configured PUCCH resources can be arranged into a plurality of predetermined groups, with each group comprising a plurality of the configured PUCCH resources. For example, the predetermined group arrangement can be understood by the network node and the UE without explicit communication. In other embodiments, the one or more control messages can also include identification of a plurality of groups of the configured PUCCH resources, with each group comprising a plurality of the configured PUCCH resources.

The exemplary methods and/or procedures can also include receiving, from the network node, a further control message comprising: 1) identification of a first spatial relation of the plurality of spatial relations; and 2) an indication of whether the first spatial relation applies to a single PUCCH resource of the configured PUCCH resources, or to at least one group of PUCCH resources of the configured PUCCH resources. In some exemplary embodiments, the further control message can also include a resource identifier that identifies a particular configured PUCCH resource, or a particular group of configured PUCCH resources, to which the first spatial relation applies. In some embodiments, an indication that the first spatial relation applies to all of the configured PUCCH resources can be an absence of any such resource identifiers in the further control message.

In some embodiments, the exemplary methods and/or procedures can also include transmitting, to the network node, a PUCCH message according to the first spatial relation using a configured PUCCH resource to which the first spatial relation applies.

Other exemplary embodiments include network nodes (e.g., base station, eNB, gNB, ng-eNB, en-gNB, etc., or component thereof) or user equipment (e.g., UE or component of a UE, such as a modem) configured to perform operations corresponding to any of the exemplary methods and/or procedures described herein. Other exemplary embodiments include non-transitory, computer-readable media storing program instructions that, when executed by at least one processor, configure such network nodes or such UEs to perform operations corresponding to any of the exemplary methods and/or procedures described herein.

These and other objects, features and advantages of the exemplary embodiments of the present disclosure will become apparent upon reading the following detailed description in view of the accompanying drawings.

BRIEF DESCRIPTION OF THE DRAWINGS

FIG. 2 illustrates an exemplary MAC-CE message comprising a spatial relation ID and a PUCCH resource ID, according to various exemplary embodiments.

FIG. 3 illustrates an exemplary mapping of MAC-CE PUCCH Resource ID contents to actual PUCCH resource IDs, according to various exemplary embodiments.

FIG. 4 illustrates an exemplary MAC-CE message structure comprising a dedicated flag bit, according to various exemplary embodiments.

FIG. 5 illustrates an exemplary MAC-CE message structure comprising a PUCCH Spatial Group ID, according to various exemplary embodiments.

FIG. 6 illustrates an exemplary mapping of PUCCH Spatial Group ID values to actual PUCCH resource IDs, according to various exemplary embodiments.

FIG. 7 illustrates an exemplary MAC-CE message structure comprising a plurality of Spatial Group ID fields, according to various exemplary embodiments.

DETAILED DESCRIPTION

Figure 1:
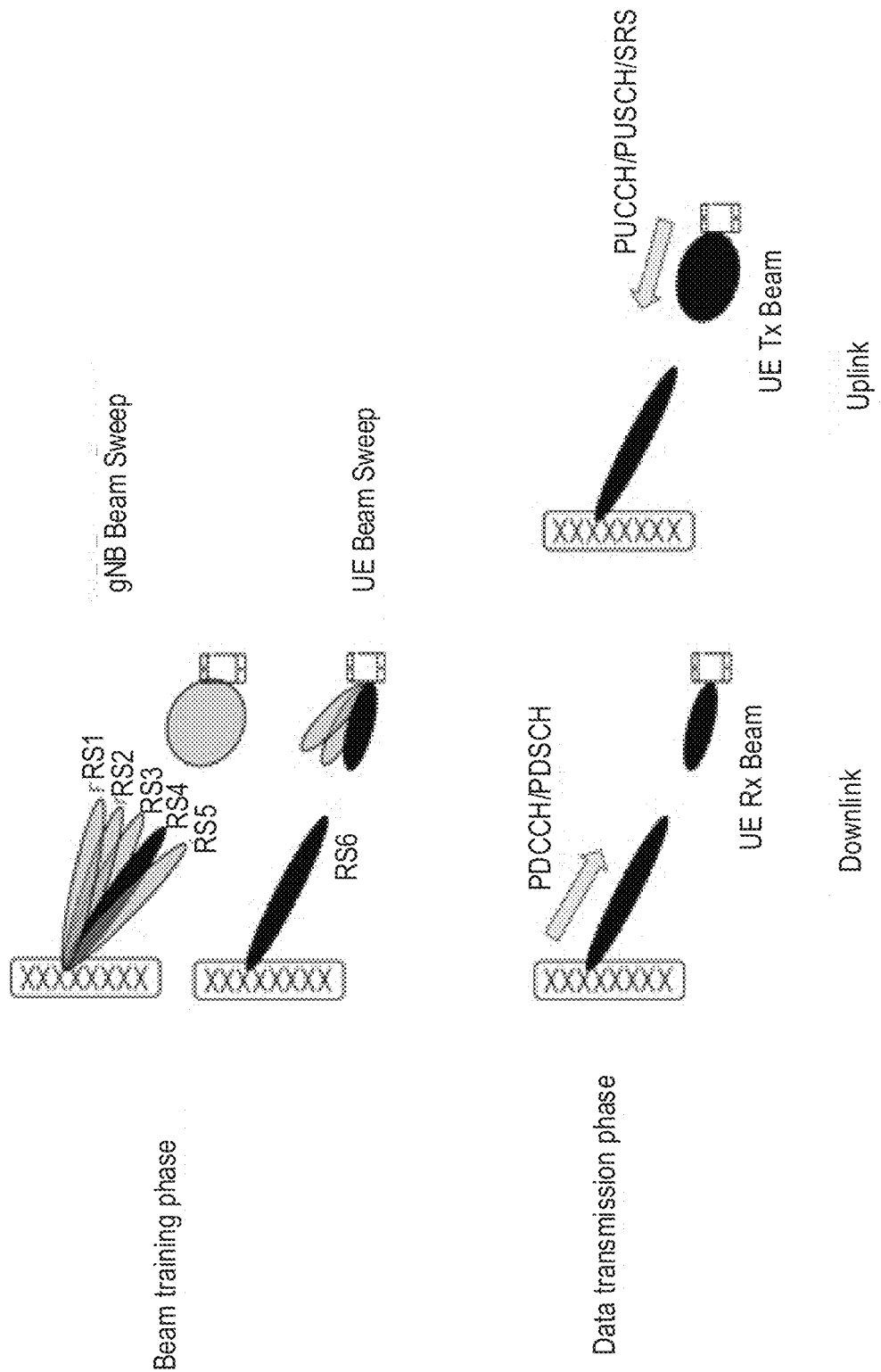
FIG. 1 illustrates an exemplary combination of a beam training phase, between a gNB and a UE, followed by a data transmission phase utilizing the results of the training phase, according to various exemplary embodiments.

As briefly mentioned above, the use of individualized MAC CE messages to update spatial relations for a UE's configured PUCCH resources allows for maximum flexibility that can be beneficial in some scenarios, but is unnecessary in other scenarios. In fact, in these other scenarios, there can be significant redundancy in these individualized MAC CE messages, leading to waste of resources in downlink signaling channels carrying the MAC CE messages. This is discussed in more detail below.

In NR Rel-15, there are five different PUCCH formats defined. PUCCH format 0 and 1 are defined to carry up to two (2) uplink control information (UCI) bits, while PUCCH formats 2, 3, and 4 are defined to carry more than two (2) bits. Two UCI bits are sufficient to carry hybrid ARQ acknowledgements (e.g., both positive and negative, referred to collectively as HARQ-ACK) and/or scheduling requests (SR), while the other PUCCH formats can carry CSI reports in addition to HARQ-ACK and SR, and thus handle larger UCI payloads.

In multi-transmission point (multi-TRP) applications, the DL serving node and the UL reception node for a given UE are not necessarily identical. The preferred DL reception node for UE receiving data is associated to the node from which the UE receives the highest-power signal. On the other hand, the preferred UL reception node for UE transmitting data is often the node associated to the smallest path loss. In heterogeneous network (het-net) deployments, there can be transmit power imbalances between macro and pico nodes. Moreover, factors such as interference patterns and traffic conditions can also affect the choice of transmission and reception node for a given UE. As such, it is often convenient, desirable, and/or necessary to decouple the preferred DL transmission node and UL reception node for certain UEs.

Even so, different nodes in the network may be linked by backhaul connections associated with different levels of latency. Depending on the processing and transport latency for certain operations, it can be convenient, desirable, and/or necessary to deploy network architectures in which different functions are performed at different nodes. For example, UL scheduling assignments can be at least partly determined by a scheduler that is implemented (functionally and/or logically) close to the UL data reception node for a given UE, while a corresponding DL scheduler can be implemented (functionally and/or logically) close to the DL data transmission node for the same UE.

As briefly mentioned above, UL control signaling conveyed on PUCCH consists of various messages and formats, including CSI feedback regarding DL channel conditions, HARQ-ACK relative to DL transmissions, and scheduling requests (SR) for UL transmissions. In a decoupled UL/DL scenario, it can be convenient to convey PUCCH DL-related signaling to the preferred node handling DL transmission and PUCCH UL-related signaling (e.g., SR) to the preferred node handling UL reception. Such an arrangement can avoid the latency, complexity, and load that would otherwise occur if PUCCH messages were forwarded between nodes over a backhaul network.

Nevertheless, some problems exist with these arrangements. As discussed above, while a list of only eight (8) spatial relations is configured by the RRC parameter PUCCH-SpatialRelationInfo, the MAC-CE message indicates a selection from this list on a per-PUCCH resource basis, which for NR can be up to 128 configured PUCCH resources. FIG. 2 shows an exemplary MAC-CE message that can be used to indicate a spatial relation for a PUCCH resource. In this exemplary MAC-CE message, the spatial relation ID occurs in least significant bits (LSBs) of the first octet, and the PUCCH resource ID occurs in the LSBs. The remaining or unused bits are marked as "spare."

Hence, if the gNB wants to update the spatial relation for all PUCCH resources, it must transmit a separate MAC-CE message, such as shown in FIG. 2, for each of the (up to 128) PUCCH resources. Although this allows for maximum flexibility, this degree of flexibility is not needed in many cases. For example, it would be unusual for the gNB to indicate to the UE that one PUCCH resource carrying HARQ-ACK should be beamformed in a different direction than another PUCCH resource carrying CSI, since both feedback types are related to DL transmission.

A more typical scenario is that the spatial relation for all configured PUCCH resources carrying DL related feedback is the same. To support this more typical scenario, the gNB would need to transmit potentially very many (e.g., up to 128) MAC-CE messages with exactly the same spatial relation ID. This would be very wasteful in terms of overhead. Furthermore, there is a need to support dual-DL scenarios that can require PUCCH (CSI and HARQ-ACK) related to PDSCH transmissions to be beamformed toward one node (e.g., TRP1), and PUCCH related to other PDSCH transmissions to be beamformed towards a second node (e.g., TRP2).

Exemplary embodiments disclosed herein address these problems, issues, and/or drawbacks of existing solutions by providing a flexible but efficient approach for indicating PUCCH spatial relations over MAC-CE when a common spatial relation indicator is shared by multiple PUCCH resources. Exemplary embodiments accomplish this in various particular ways. In some embodiments, a UE can be configured to ignore a PUCCH resource ID field in MAC-CE, such that a provided spatial relation indicator is applied to all configured PUCCH resources. Alternatively, a PUCCH resource ID field can be removed from the MAC-CE message. In some embodiments, a particular combination of bits in the PUCCH resource ID field can indicate that a provided spatial relation indicator should apply commonly to all configured PUCCH resources, while other combination(s) of bits in the resource ID field can indicate per-resource application of the spatial relation indicator.

In some embodiments, a flag bit in a MAC-CE message can indicate whether a provided spatial relation indicator should be applied commonly or per individual PUCCH resource. Such embodiments can also indicate whether a provided spatial relation indicator should be applied within a particular group, set, or subset of all PUCCH resources, or per individual PUCCH resource.

In some embodiments, a PUCCH resource ID field in a MAC-CE message can be used to indicate a spatial resource group ID. The resources corresponding to a particular spatial resource group ID can be provided to the UE in various ways including, e.g., as part of an RRC message used to configure PUCCH resource(s). In variations of these embodiments, a predetermined, fixed mapping of PUCCH resource ID(s) to spatial group can be known by both the UE and the network node. Furthermore, a mapping of PUCCH resource ID(s) to a spatial group can be newly defined or reuse existing grouping already used for other purposes (e.g., PUCCH resource sets).

In some embodiments, a MAC-CE message can carry multiple spatial relation IDs corresponding to multiple spatial resource groups. In some embodiments, a PUCCH spatial resource group can be indicated by the PUCCH format and/or by the PUCCH content (e.g., SR, CSI, HARQ-ACK). For example, if the spatial relation is updated for a PUCCH resource having format 0, then this can indicate that other PUCCH resources configured as format 0 are also to be updated.

When used in NR UEs and network nodes supporting PUCCH spatial relation functionality, these exemplary embodiments provide various benefits and/or advantages including reduced signaling overhead in both downlink and uplink; reduced delay in signaling PUCCH spatial relations for multiple resources; better support for decoupled uplink/downlink implementations; and reduced energy consumption for transmission and/or reception of PUCCH messages. Other benefits and/or advantages will be readily apparent, to persons of ordinary skill, from the more detailed description of these embodiments that follows.

In some exemplary embodiments (referred to collectively as "Embodiment 1" for convenience only), signaling overhead is reduced to a minimum, which benefits the scenario where a common spatial relation is used for all PUCCH resources. In such embodiments, the UE can be configured to ignore the PUCCH Resource ID field provided in a MAC-CE message and, instead, apply the Spatial Relation ID provided in that message to all configured PUCCH resources. For example, a configuration flag can be included in an RRC configuration of PUCCH (e.g., added to configuration attributes applying to all PUCCH resources) to indicate whether or not the UE should ignore particular Resource ID field(s) provided in one or more messages and apply the received Spatial Relation ID to all PUCCH resources.

In another variation of Embodiment 1, the PUCCH Resource ID field can be removed from the MAC-CE message. When the UE recognizes that a received MAC-CE message includes no such field, the UE applies the spatial relation to all PUCCH resources. In another alternative, the UE can respond to a missing or ignored PUCCH Resource ID field by applying the received Spatial Relation ID to all other Spatial Relation IDs that are associated with the same PUCCH format (e.g., 0 or 1) as the received Spatial Relation ID.

In other exemplary embodiments (referred to collectively as "Embodiment 2" for convenience only), a particular combination of bits in the PUCCH resource ID field can be "reserved", such that when the reserved combination appears in a MAC-CE message, it indicates to a UE that the particular Spatial Relation ID provided in the same messages should apply commonly to all PUCCH resources. On the other hand, other "non-reserved" combination(s) of bits in the resource ID field can indicate application of the provided Spatial Relation ID to the resource indicated by the provided PUCCH resource ID. FIG. 3 illustrates an exemplary mapping of MAC-CE PUCCH Resource ID field values to actual PUCCH resource IDs, according to this embodiment. As shown in FIG. 3, the all-zero PUCCH resource ID value is "reserved" to indicate the common application of the corresponding Spatial Relation ID, whereas all other values indicate the particular PUCCH resource ID to which the corresponding Spatial Relation ID should apply. Other variations can include multiple "reserved" values (e.g., each indicating a portion of the resource ID space) and additional bits in the resource ID field, such that all individual resource IDs can be indicated along with "reserved" values.

In other exemplary embodiments (referred to collectively as "Embodiment 3" for convenience only), a "dedicated" flag bit in a MAC-CE message can be used to indicate whether a particular Spatial Relation ID provided in the message should be applied commonly to all configured PUCCH resources, or individually to the provided Spatial Relation ID. FIG. 4 illustrates an exemplary MAC-CE message structure comprising such a flag bit, according to these exemplary embodiments. According to the example in FIG. 4, when the flag bit is set to 1, the UE should ignore the provided PUCCH Resource ID field and apply the provided Spatial Relation ID to all configured PUCCH resources. Conversely, when the flag is set to zero (e.g., cleared), the UE should apply the provided Spatial Relation ID to the particular PUCCH resource indicated by the PUCCH resource ID provided in the message.

In a variation of Embodiment 3, rather than distinguishing between a particular resource indicated in the message and all configured PUCCH resources, the flag bit can be configured to distinguish between a particular indicated resource and a pre-defined group, set, or subset of PUCCH resources. For example, a pre-defined group of PUCCH resources could be a PUCCH Resource Set, which is defined in NR for purposes and/or operations other than spatial relations. As currently defined, up to four (4) PUCCH Resource Sets can be supported, each set having a maximum of 32 PUCCH resources. As such, by setting the flag bit is set to one, the network can configure Spatial Relation IDs for all PUCCH resources comprising a PUCCH Resource set using a single MAC-CE message.

In other exemplary embodiments (referred to collectively as "Embodiment 4" for convenience only), a MAC-CE message can include a "PUCCH Spatial Group ID" instead of, or in addition to, the seven-bit PUCCH Resource ID field. In some embodiments, the PUCCH Spatial Group ID can include fewer than seven (7) bits. FIG. 5 shows an exemplary MAC-CE message structure comprising a two-bit PUCCH Spatial Group ID, according to various exemplary embodiments. In the example shown in FIG. 5, the "Group ID" field replaces two of the "spare" bits of message octet 1 (e.g., octet 1 shown in FIGS. 2 and/or 4). According to Embodiment 4, the configured PUCCH resources can be divided into M groups, and the Spatial Relation ID signaled in a MAC-CE message can be applied to all PUCCH resources in the group indicated by the Spatial Group ID included in the message. The mapping of PUCCH resources to a particular Spatial Group can be configured by the network via, e.g., a specific IE in an RRC PUCCH resource configuration message. Based on such a configuration message, when the UE subsequently receives a MAC-CE message comprising a configured Spatial Group ID, it can determine the actual configured PUCCH resources corresponding to that Spatial Group ID.

In other exemplary embodiments (referred to collectively as "Embodiment 5" for convenience only), one or more predetermined mappings between PUCCH resources (e.g., PUCCH resource IDs) and spatial groups (e.g., Spatial Group IDs) can be known by both the UE and the network node. Such mappings can be specified, e.g., in a 3GPP specification. FIG. 6 shows a table that illustrates an exemplary mapping of PUCCH Spatial Group ID values to actual PUCCH resource IDs, according to these embodiments. Both the number of groups (4) and the number of PUCCH resources per group (32) merely exemplary. Other values can be used as needed and/or desired. Moreover, the number of PUCCH resources per group does not need to be constant, i.e., different Spatial Group IDs can correspond to groups with different numbers of PUCCH resources.

Furthermore, the mapping into Spatial Groups can be based on a mapping of PUCCH resources for a different purpose, such as the mapping into PUCCH Resource Sets described above. Such existing mappings can be predetermined (e.g., defined in a 3GPP specification) or configured by the RRC protocol. In variations of Embodiment 5, the mapping between PUCCH resources and Spatial Groups can be based on the configured format of the PUCCH resources. For example, all PUCCH resources configured as format 0 can be associated with one Spatial Group ID, and all PUCCH resources configured as format 1 can be associated with a second Spatial Group ID. In this manner, a UE can interpret a particular Spatial Group ID provided in a MAC-CE message as an instruction to apply the spatial relation, indicated by the Spatial Relation ID in the same message, to all PUCCH resources associated with the provided Spatial Group ID (e.g., all PUCCH resources configured as a particular format).

In variations of Embodiment 5, a PUCCH Spatial Group can be indicated by a subset of bits used to indicate the PUCCH resource ID. For example, when the number of PUCCH Spatial Groups is K, the $\log_2(K)$ most significant bits (MSBs) of the PUCCH resource ID can indicate the PUCCH Spatial Group ID. Referring to FIG. 2, when K=4, a PUCCH Spatial Group ID can be indicated by bits b6-b5 of Octet 2. When receiving a MAC-CE message according to this format, the UE can apply the spatial relation indicated by Spatial Relation ID (i.e., bits b2-b0 of Octet 1) to all configured PUCCH resources associated with the PUCCH Spatial Group ID indicated by b6-b5 of Octet 1.

In some embodiments, a flag bit (as described above in relation to Embodiment 3) can be used to indicate whether the provided Spatial Relation ID should be applied to a single PUCCH resource (indicated by the provided PUCCH resource ID) or to a group of PUCCH resources (associated with the provided PUCCH Spatial Group ID). In such case, b6-b5 of Octet 2 can be interpreted differently by the UE based on the value of the flag bit. Likewise, bits b4-b0 of Octet 2 can be ignored by the UE if the flag value indicates group application.

In other exemplary embodiments (referred to collectively as "Embodiment 6" for convenience only), a MAC-CE message can carry multiple spatial relation IDs corresponding to multiple spatial relation groups. FIG. 1 illustrates an exemplary MAC-CE message structure comprising a plurality of (e.g., two) Spatial Group ID fields, according to these exemplary embodiments. In the arrangement shown in FIG. 7, bits b2-b0 of Octet 1 can indicate the Spatial Relation ID for PUCCH Spatial Group 1 and bits b5-b3 of Octet 1 can indicate the Spatial Relation ID for PUCCH Spatial Group 2. Note that to indicate Spatial Relation to more than two PUCCH Spatial Groups, more than one octet is needed within a MAC CE message for this purpose.

In other exemplary embodiments (referred to collectively as "Embodiment 7" for convenience only), a PUCCH Spatial Group ID can be indicated by the PUCCH content (e.g., SR, CSI, HARQ-ACK). For example, one Spatial Group ID can be associated with all PUCCH resources utilized to carry UL-related signaling (e.g., SR) and a second Spatial Group ID can be associated with all PUCCH resources utilized to carry DL-related signaling (e.g., CSI, HARQ-ACK). In this manner, a single MAC-CE message comprising a single Spatial Group ID can be used to configure a particular spatial relation (indicated by a Spatial Relation ID provided in the message) for all configured UL- (or DL-)related PUCCH resources. In this manner, different spatial relations can be configured for efficient handling UL- and DL-related feedback from a UE, which can facilitate efficient scheduling in the decoupled UL/DL scenarios discussed above.

In a variation of Embodiment 7, various approaches can be used to address the situation where the UE is sending UL- and DL-related information in the same PUCCH message. For example, a third Spatial Group ID can be defined to apply to these scenarios. Alternately, a rule based on PUCCH format can be used. For example, if the UE transmits a SR only, then it should use the spatial relation for SR (or PUCCH format 0), but if the UE transmit SR and HARQ-ACK together, then it should use the spatial relation for HARQ-ACK (or PUCCH format 1).

Figure 8:
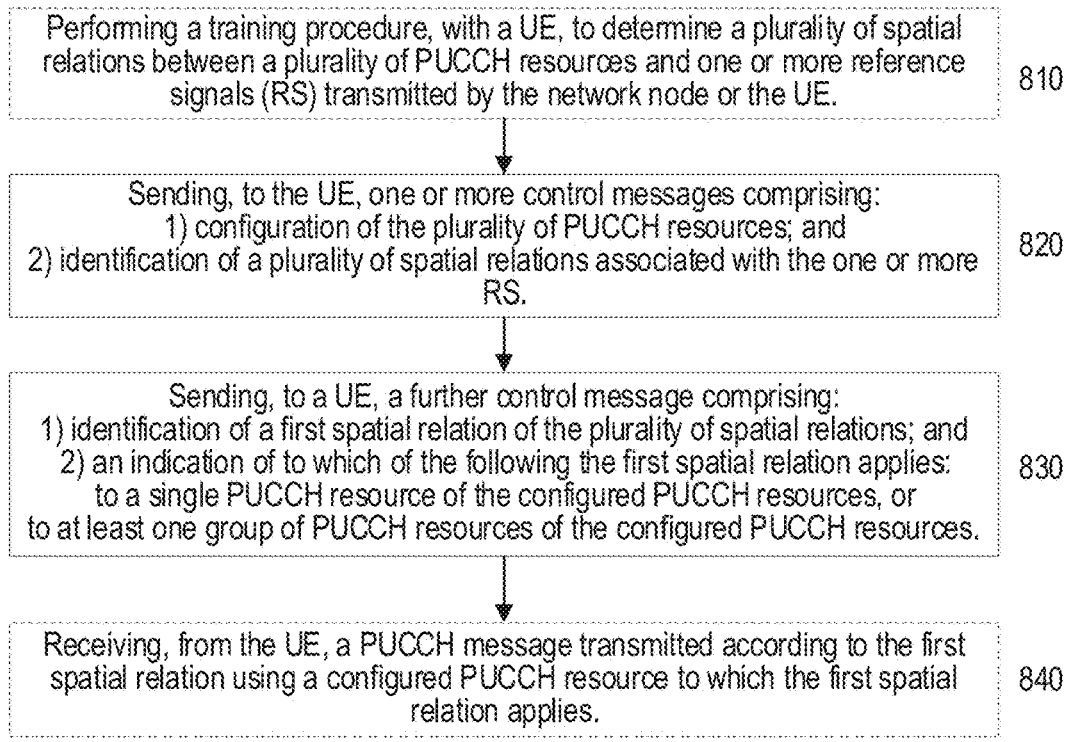
FIG. 8 illustrates a flow diagram of an exemplary method and/or procedure for use by a network node, according to various exemplary embodiments.

FIG. 8 shows a flow diagram of an exemplary method and/or procedure for configuring Physical Uplink Control Channel (PUCCH) resources usable in communication with a user equipment (UE) in a wireless communication network, according to one or more exemplary embodiments of the present disclosure. The exemplary method and/or procedure shown in FIG. 8 can be performed by a network node (e.g., base station, eNB, gNB, ng-eNB, en-gNB, etc., or component thereof) in a wireless communication network, such as shown in or described in relation to other figures herein. Furthermore, the exemplary method and/or procedure shown in FIG. 8 can be utilized cooperatively with other exemplary methods and/or procedures described herein to provide various exemplary benefits and/or advantage. Although FIG. 8 shows blocks in a particular order, this order is merely exemplary, and the operations of the exemplary method and/or procedure can be performed in a different order than shown in FIG. 8 and can be combined and/or divided into blocks having different functionality. Optional operations are indicated by dashed lines.

In some embodiments, the exemplary method and/or procedure illustrated in FIG. 8 can include the operations of block 810, where the network node can perform a training procedure, with the UE, to determine the plurality of spatial relations between a plurality of PUCCH resources and one or more reference signals (RS) transmitted by the UE or by the network node. For example, the one or more RS can include a downlink (DL) RS (e.g., CSI-RS or SSB) or uplink (UL) RS (e.g., SRS).

The exemplary method and/or procedure can also include the operations of block 820, where the network node can send, to the UE, one or more control messages comprising: 1) configuration of a plurality of PUCCH resources; and 2) identification of a plurality of spatial relations associated with the one or more RS. In some embodiments, the configured PUCCH resources can be arranged into a plurality of predetermined groups, with each group comprising a plurality of the configured PUCCH resources. For example, the predetermined group arrangement can be understood by the network node and the UE without explicit communication.

In other embodiments, the one or more control messages can also include identification of a plurality of groups of the configured PUCCH resources, with each group comprising a plurality of the configured PUCCH resources. In some embodiments, each of the groups can be a PUCCH Resource Set that is configured for operations other than spatial relations.

In some embodiments, the plurality of groups can include a first group of PUCCH resources configured according to a first format, and a second group of PUCCH resources configured according to a second format different than the first format. In some embodiments, the plurality of groups can include a first group of PUCCH resources configured to carry signaling related to uplink (UL) transmissions by the UE, and a second group of PUCCH resources configured to carry signaling relating to downlink (DL) transmission by the network node. In some embodiments, the plurality of groups can also include a third group of PUCCH resources configured to carry signaling related to UL transmissions and signaling relating to DL transmissions.

The exemplary method and/or procedure can also include the operations of block 830, where the network node can send, to the UE, a further control message comprising: 1) identification of a first spatial relation of the plurality of spatial relations; and 2) an indication of whether the first spatial relation applies to a single PUCCH resource of the configured PUCCH resources, or to at least one group of PUCCH resources of the configured PUCCH resources. In some exemplary embodiments, the further control message can also include a resource identifier that identifies a particular configured PUCCH resource, or a particular group of configured PUCCH resources, to which the first spatial relation applies. In some embodiments, an indication that the first spatial relation applies to all of the configured PUCCH resources can be an absence of any such resource identifiers in the further control message.

In some embodiments, the resource identifier comprises one of: 1) a first value indicating that the first spatial relation applies to all of the configured PUCCH resources; or 2) one of a plurality of second values, each second value identifying a particular configured PUCCH resource to which the first spatial relation applies. In other embodiments, the resource identifier comprises one of: 1) one of a plurality of first values, each first value identifying a particular group of the configured PUCCH resource to which the first spatial relation applies; or 2) one of a plurality of second values, each second value identifying a particular configured PUCCH resource to which the first spatial relation applies.

In some embodiments in which the further control message includes the resource identifier, the indication can comprise a flag that can take on a first value and a second value. In such embodiments, the first value can indicate that the first spatial relation applies to a particular configured PUCCH resource that is associated with the resource identifier. In some embodiments, the second value can indicate that the resource identifier should be ignored and that the first spatial relation applies to the at least one group of the configured PUCCH resources. In other embodiments, the second value can indicate that the first spatial relation applies to a particular group of the configured PUCCH resources, and the particular group can be identified by a portion of the resource identifier (e.g., by the N most significant bits of an M-bit identifier, M>N).

In some embodiments, when the configured PUCCH resources are arranged into a plurality of groups (which may be predetermined), and the indication indicates that the first spatial relation applies to the at least one group, the further control message can also include one or more group identifiers associated with corresponding one or more particular groups of configured PUCCH resources to which the first spatial relation applies.

In some embodiments, the exemplary method and/or procedure can also include the operations of block 840, in which the network node can receive, from the UE, a PUCCH message transmitted according to the first spatial relation using a configured PUCCH resource to which the first spatial relation applies.

Figure 9:
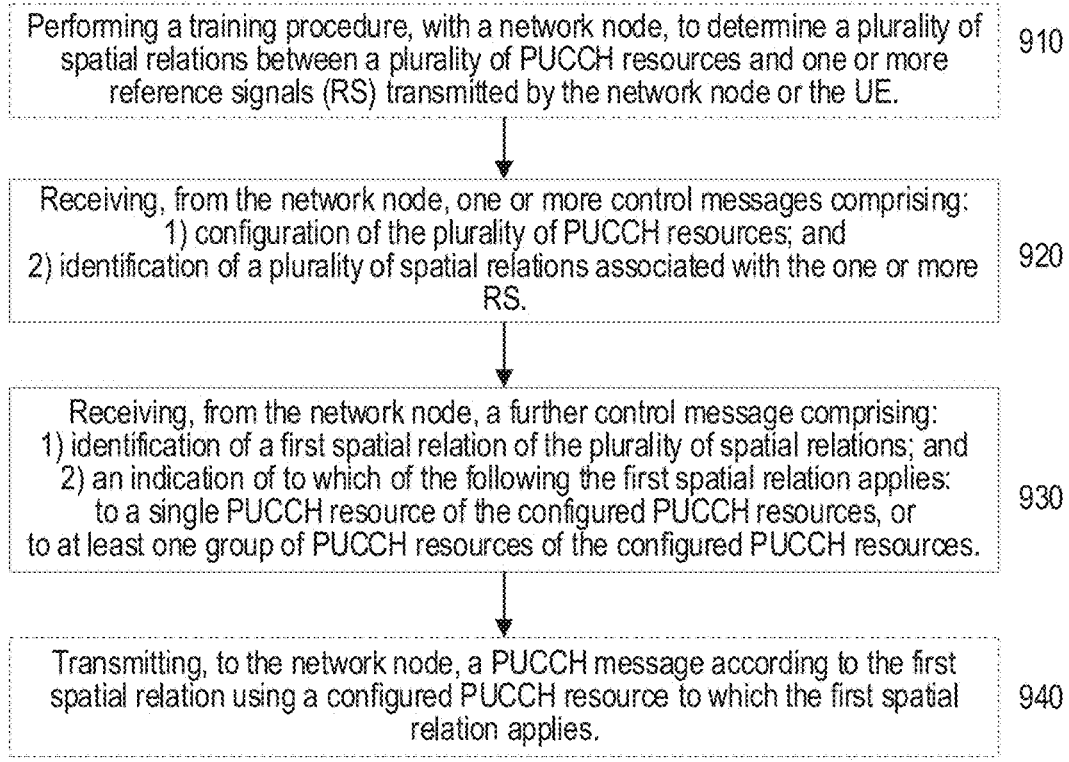
FIG. 9 illustrates a flow diagram of an exemplary method and/or procedure for use by a wireless communication device, according to various exemplary embodiments.

FIG. 9 shows a flow diagram of an exemplary method and/or procedure for configuring Physical Uplink Control Channel (PUCCH) resources usable in communication with a user equipment (UE) in a wireless communication network, according to one or more exemplary embodiments of the present disclosure. The exemplary method and/or procedure shown in FIG. 9 can be performed by UE (or component thereof) in communication with a network node (e.g., base station, eNB, gNB, ng-eNB, en-gNB, etc., or component thereof) in a wireless communication network, such as shown in or described in relation to other figures herein. Furthermore, the exemplary method and/or procedure shown in FIG. 9 can be utilized cooperatively with other exemplary methods and/or procedures described herein to provide various exemplary benefits and/or advantage. Although FIG. 9 shows blocks in a particular order, this order is merely exemplary, and the operations of the exemplary method and/or procedure can be performed in a different order than shown in FIG. 9 and can be combined and/or divided into blocks having different functionality. Optional operations are indicated by dashed lines.

In some embodiments, the exemplary method and/or procedure illustrated in FIG. 9 can include the operations of block 910, where the UE can perform a training procedure, with the network node, to determine the plurality of spatial relations between a plurality of PUCCH resources and one or more reference signals (RS) transmitted by the UE or by the network node. For example, the one or more RS can include a downlink (DL) RS (e.g., CSI-RS or SSB) or uplink (UL) RS (e.g., SRS).

The exemplary method and/or procedure can also include the operations of block 920, where the UE can receive, from the network node, one or more control messages comprising: 1) configuration of a plurality of PUCCH resources; and 2) identification of a plurality of spatial relations associated with the one or more RS. In some embodiments, the configured PUCCH resources can be arranged into a plurality of predetermined groups, with each group comprising a plurality of the configured PUCCH resources. For example, the predetermined group arrangement can be understood by the network node and the UE without explicit communication.

In other embodiments, the one or more control messages can also include identification of a plurality of groups of the configured PUCCH resources, with each group comprising a plurality of the configured PUCCH resources. In some embodiments, each of the groups can be a PUCCH Resource Set that is configured for operations other than spatial relations.

In some embodiments, the plurality of groups can include a first group of PUCCH resources configured according to a first format, and a second group of PUCCH resources configured according to a second format different than the first format. In some embodiments, the plurality of groups can include a first group of PUCCH resources configured to carry signaling related to uplink (UL) transmissions by the UE, and a second group of PUCCH resources configured to carry signaling relating to downlink (DL) transmission by the network node. In some embodiments, the plurality of groups can also include a third group of PUCCH resources configured to carry signaling related to UL transmissions and signaling relating to DL transmissions.

The exemplary method and/or procedure can also include the operations of block 930, where the UE can receive, from the network node, a further control message comprising: 1) identification of a first spatial relation of the plurality of spatial relations; and 2) an indication of whether the first spatial relation applies to a single PUCCH resource of the configured PUCCH resources, or to at least one group of PUCCH resources of the configured PUCCH resources. In some exemplary embodiments, the further control message can also include a resource identifier that identifies a particular configured PUCCH resource, or a particular group of configured PUCCH resources, to which the first spatial relation applies. In some embodiments, an indication that the first spatial relation applies to all of the configured PUCCH resources can be an absence of any such resource identifiers in the further control message.

In some embodiments, the resource identifier comprises one of: 1) a first value indicating that the first spatial relation applies to all of the configured PUCCH resources; or 2) one of a plurality of second values, each second value identifying a particular configured PUCCH resource to which the first spatial relation applies. In other embodiments, the resource identifier comprises one of: 1) one of a plurality of first values, each first value identifying a particular group of the configured PUCCH resource to which the first spatial relation applies; or 2) one of a plurality of second values, each second value identifying a particular configured PUCCH resource to which the first spatial relation applies.

In some embodiments in which the further control message includes the resource identifier, the indication can comprise a flag that can take on a first value and a second value. In such embodiments, the first value can indicate that the first spatial relation applies to a particular configured PUCCH resource that is associated with the resource identifier. In some embodiments, the second value can indicate that the resource identifier should be ignored and that the first spatial relation applies to the at least one group of the configured PUCCH resources. In other embodiments, the second value can indicate that the first spatial relation applies to a particular group of the configured PUCCH resources, and the particular group can be identified by a portion of the resource identifier (e.g., by the N most significant bits of an M-bit identifier, M>N).

In some embodiments, when the configured PUCCH resources are arranged into a plurality of groups (which may be predetermined), and the indication indicates that the first spatial relation applies to the at least one group, the further control message can also include one or more group identifiers associated with corresponding one or more particular groups of configured PUCCH resources to which the first spatial relation applies.

In some embodiments, the method and/or procedure can also include the operations of block 940, in which the UE can transmit, to the network node, a PUCCH message according to the first spatial relation using a configured PUCCH resource to which the first spatial relation applies.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 10:
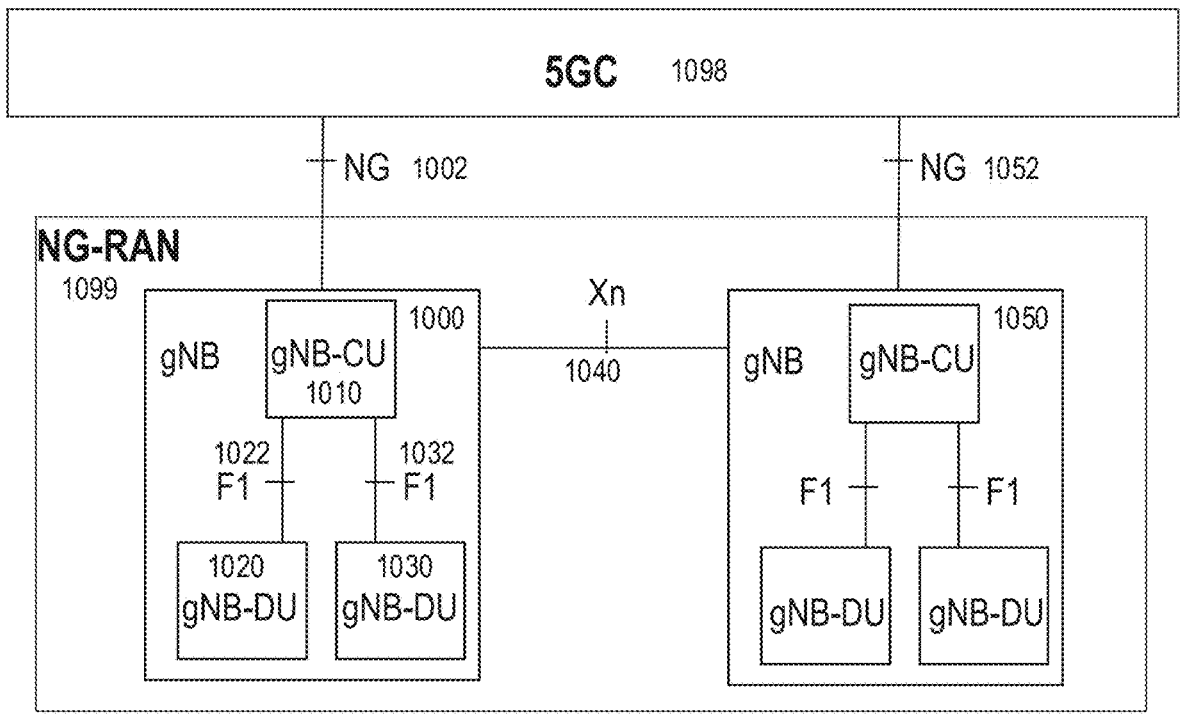
FIGS. 10-11 illustrate two high-level views of an exemplary 5G network architecture.

FIG. 10 illustrates a high-level view of the 5G network architecture, consisting of a Next Generation RAN (NG-RAN) 1099 and a 5G Core (5GC) 1098. NG-RAN 1099 can include a set gNBs connected to the 5GC via one or more NG interfaces, such as gNBs 1000, 1050 connected via interfaces 1002, 1052, respectively. In addition, the gNBs can be connected to each other via one or more Xn interfaces, such as Xn interface 1040 between gNBs 1000 and 1050.

NG-RAN 1099 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

The NG-RAN logical nodes shown in FIG. 10 (and described in TS 38.401 and TR 38.801) include a central (or centralized) unit (CU or gNB-CU) and one or more distributed (or decentralized) units (DU or gNB-DU). For example, gNB 1000 includes gNB-CU 1010 and gNB-DUs 1020 and

1030. CUs (e.g., gNB-CU 1010) are logical nodes that host higher-layer protocols and perform various gNB functions such controlling the operation of DUs. Similarly, each DU is a logical node that hosts lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 1022 and 1032 shown in FIG. 10. The gNB-CU and connected gNB-DUs are only visible to other gNBs and 5GC 1098 as a gNB. In other words, the F1 interface is not visible beyond a gNB-CU.

Figure 11:
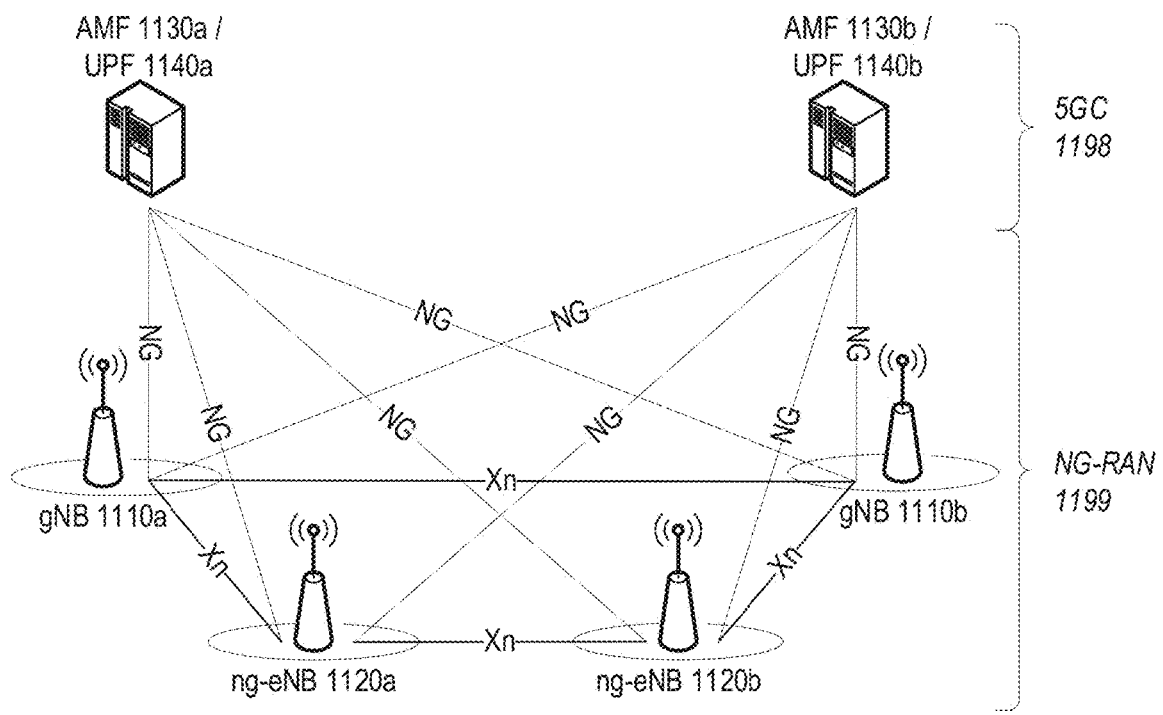

FIG. 11 shows a high-level view of an exemplary 5G network architecture, including a Next Generation Radio Access Network (NG-RAN) 1199 and a 5G Core (5GC) 1198. As shown in the figure, NG-RAN 1199 can include gNBs 1110 (e.g., 1110$a,b$) and ng-eNBs 1120 (e.g., 1120$a,b$) that are interconnected with each other via respective Xn interfaces. The gNBs and ng-eNBs are also connected via the NG interfaces to 5GC 1198, more specifically to the AMF (Access and Mobility Management Function) 1130 (e.g., AMFs 1130$a,b$) via respective NG-C interfaces and to the UPF (User Plane Function) 1140 (e.g., UPFs 1140$a,b$) via respective NG-U interfaces.

Each of the gNBs 1110 can support the NR radio interface, including frequency division duplexing (FDD), time division duplexing (TDD), or a combination thereof. In contrast, each of ng-eNBs 1120 supports the LTE radio interface but, unlike conventional LTE eNBs, connect to the 5GC via the NG interface.

Figure 12:
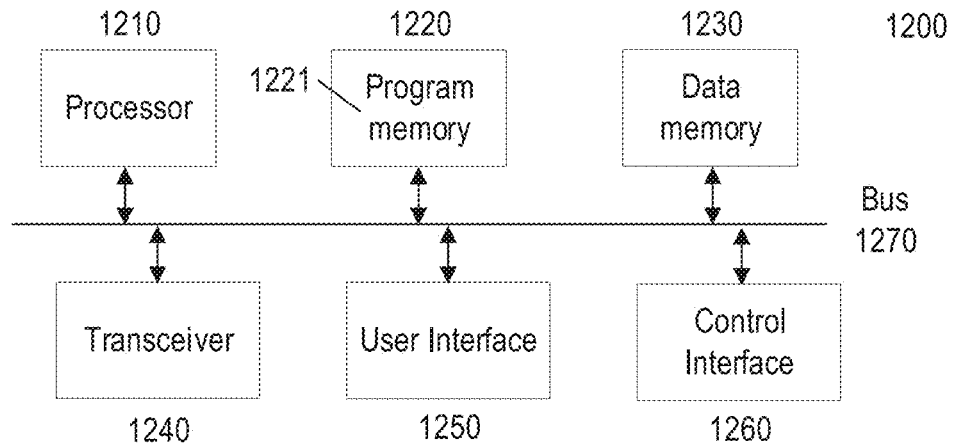
FIG. 12 illustrates a block diagram of an exemplary wireless device or UE configurable according to various exemplary embodiments.

FIG. 12 shows a block diagram of an exemplary wireless device or user equipment (UE) configurable according to various exemplary embodiments of the present disclosure, including by execution of instructions on a computer-readable medium that correspond to, or comprise, any of the exemplary methods and/or procedures described above.

Exemplary device 1200 can comprise a processor 1210 that can be operably connected to a program memory 1220 and/or a data memory 1230 via a bus 1270 that can comprise parallel address and data buses, serial ports, or other methods and/or structures known to those of ordinary skill in the art. Program memory 1220 can store software code, programs, and/or instructions (collectively shown as computer program product 1221 in FIG. 12) executed by processor 1210 that can configure and/or facilitate device 1200 to perform various operations, including operations described below. For example, execution of such instructions can configure and/or facilitate exemplary device 1200 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with transceiver 1240, user interface 1250, and/or host interface 1260.

As another example, processor 1210 can execute program code stored in program memory 1220 that corresponds to MAC, RLC, PDCP, and RRC layer protocols standardized by 3GPP (e.g., for NR and/or LTE). As a further example, processor 1210 can execute program code stored in program memory 1220 that, together with transceiver 1240, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1220 can also comprises software code executed by processor 1210 to control the functions of device 1200, including configuring and controlling various components such as transceiver 1240, user interface 1250, and/or host interface 1260. Program memory 1220 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1220 can comprise an external storage arrangement (not shown) remote from device 1200, from which the instructions can be downloaded into program memory 1220 located within or removably coupled to device 1200, so as to enable execution of such instructions.

Data memory 1230 can comprise memory area for processor 1210 to store variables used in protocols, configuration, control, and other functions of device 1200, including operations corresponding to, or comprising, any of the exemplary methods and/or procedures described herein. Moreover, program memory 1220 and/or data memory 1230 can comprise non-volatile memory (e.g., flash memory), volatile memory (e.g., static or dynamic RAM), or a combination thereof. Furthermore, data memory 1230 can comprise a memory slot by which removable memory cards in one or more formats (e.g., SD Card, Memory Stick, Compact Flash, etc.) can be inserted and removed. Persons of ordinary skill in the art will recognize that processor 1210 can comprise multiple individual processors (including, e.g., multi-core processors), each of which implements a portion of the functionality described above. In such cases, multiple individual processors can be commonly connected to program memory 1220 and data memory 1230 or individually connected to multiple individual program memories and or data memories. More generally, persons of ordinary skill in the art will recognize that various protocols and other functions of device 1200 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A transceiver 1240 can comprise radio-frequency transmitter and/or receiver circuitry that facilitates the device 1200 to communicate with other equipment supporting like wireless communication standards and/or protocols. In some exemplary embodiments, the transceiver 1240 includes a transmitter and a receiver that enable device 1200 to communicate with various 5G/NR networks according to various protocols and/or methods proposed for standardization by 3GPP and/or other standards bodies. For example, such functionality can operate cooperatively with processor 1210 to implement a PHY layer based on OFDM, OFDMA, and/or SC-FDMA technologies, such as described herein with respect to other figures.

In some exemplary embodiments, the transceiver 1240 includes an LTE transmitter and receiver that can facilitate the device 1200 to communicate with various LTE, LTE-Advanced (LTE-A), and/or NR networks according to standards promulgated by 3GPP. In some exemplary embodiments of the present disclosure, the transceiver 1240 includes circuitry, firmware, etc. necessary for the device 1200 to communicate with various 5G/NR, LTE, LTE-A, UMTS, and/or GSM/EDGE networks, also according to 3GPP standards. In some exemplary embodiments of the present disclosure, transceiver 1240 includes circuitry, firmware, etc. necessary for the device 1200 to communicate with various CDMA2000 networks, according to 3GPP2 standards.

In some exemplary embodiments of the present disclosure, the transceiver 1240 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, transceiver 1240 can comprise a transceiver that is capable of wired communication, such as by using IEEE 802.3 Ethernet technology. The functionality particular to each of these embodiments can be coupled with or controlled by other circuitry in the device 1200, such as the processor 1210 executing program code stored in program memory 1220 in conjunction with, or supported by, data memory 1230.

User interface 1250 can take various forms depending on the particular embodiment of device 1200, or can be absent from device 1200 entirely. In some exemplary embodiments, user interface 1250 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1200 can comprise a tablet computing device including a larger touchscreen display. In such embodiments, one or more of the mechanical features of the user interface 1250 can be replaced by comparable or functionally equivalent virtual user interface features (e.g., virtual keypad, virtual buttons, etc.) implemented using the touchscreen display, as familiar to persons of ordinary skill in the art. In other embodiments, the device 1200 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1200 having a touch screen display are capable of receiving user inputs, such as inputs related to exemplary methods and/or procedures described herein or otherwise known to persons of ordinary skill in the art.

In some exemplary embodiments of the present disclosure, device 1200 can comprise an orientation sensor, which can be used in various ways by features and functions of device 1200. For example, the device 1200 can use outputs of the orientation sensor to determine when a user has changed the physical orientation of the device 1200's touch screen display. An indication signal from the orientation sensor can be available to any application program executing on the device 1200, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1260 of the device 1200 can take various forms depending on the particular exemplary embodiment of device 1200 and of the particular interface requirements of other devices that the device 1200 is intended to communicate with and/or control. For example, the control interface 1260 can comprise an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some exemplary embodiments of the present disclosure, the control interface 1260 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1200 can comprise more functionality than is shown in FIG. 12 including, for example, a video and/or still-image camera, microphone, media player and/or recorder, etc. Moreover, transceiver 1240 can include circuitry necessary to communicate using additional radio-frequency communication standards including Bluetooth, GPS, and/or others. Moreover, the processor 1210 can execute software code stored in the program memory 1220 to control such additional functionality. For example, directional velocity and/or position estimates output from a GPS receiver can be available to any application program executing on the device 1200, including various exemplary methods and/or computer-readable media according to various exemplary embodiments of the present disclosure.

Figure 13:
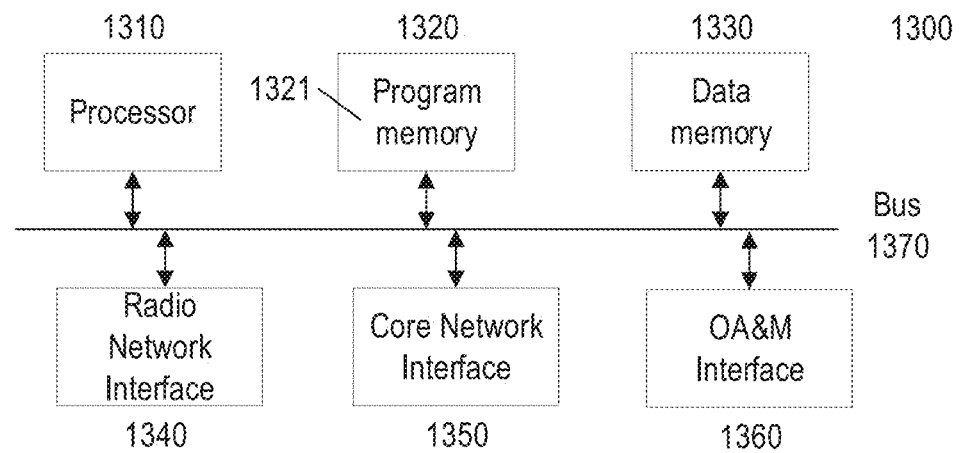
FIG. 13 illustrates a block diagram of an exemplary network node configurable according to various embodiments.

FIG. 13 shows a block diagram of an exemplary network node 1300 configurable according to various embodiments of the present disclosure, including those described above with reference to other figures. In some exemplary embodiments, network node 1300 can comprise a base station, eNB, gNB, or component thereof. Network node 1300 comprises processor 1310 which is operably connected to program memory 1320 and data memory 1330 via bus 1370, which can comprise parallel address and data buses, serial ports, or other methods and/or structures known to those of ordinary skill in the art.

Program memory 1320 can store software code, programs, and/or instructions (collectively shown as computer program product 1321 in FIG. 13) executed by processor 1310 that can configure and/or facilitate network node 1300 to perform various operations, including operations described below. For example, execution of such stored instructions can configure network node 1300 to communicate with one or more other devices using protocols according to various embodiments of the present disclosure, including one or more exemplary methods and/or procedures discussed above. Furthermore, execution of such stored instructions can also configure and/or facilitate network node 1300 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1340 and core network interface 1350. By way of example and without limitation, core network interface 1350 can comprise the S1 interface and radio network interface 1340 can comprise the Uu interface, as standardized by 3GPP. Program memory 1320 can also include software code executed by processor 1310 to control the functions of network node 1300, including configuring and controlling various components such as radio network interface 1340 and core network interface 1350.

Data memory 1330 can comprise memory area for processor 1310 to store variables used in protocols, configuration, control, and other functions of network node 1300. As such, program memory 1320 and data memory 1330 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1310 can comprise multiple individual processors (not shown), each of which implements a portion of the functionality described above. In such case, multiple individual processors may be commonly connected to program memory 1320 and data memory 1330 or individually connected to multiple individual program memories and/or data memories. More generally, persons of ordinary skill in the art will recognize that various protocols and other functions of network node 1300 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1340 can comprise transmitters, receivers, signal processors, ASICs, antennas, beamforming units, and other circuitry that enables network node 1300 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1340. According to further exemplary embodiments of the present disclosure, the radio network interface 1340 can comprise a PHY layer based on OFDM, OFDMA, and/or SC-FDMA technologies. In some embodiments, the functionality of such a PHY layer can be provided cooperatively by radio network interface 1340 and processor 1310 (including program code in memory 1320).

Core network interface 1350 can comprise transmitters, receivers, and other circuitry that enables network node 1300 to communicate with other equipment in a core network such as, in some embodiments, circuit-switched (CS) and/or packet-switched Core (PS) networks. In some embodiments, core network interface 1350 can comprise the S1 interface standardized by 3GPP. In some exemplary embodiments, core network interface 1350 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1350 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1360 can comprise transmitters, receivers, and other circuitry that enables network node 1300 to communicate with external networks, computers, databases, and the like for purposes of operations, administration, and maintenance of network node 1300 or other network equipment operably connected thereto. Lower layers of OA&M interface 1360 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1340, core network interface 1350, and OA&M interface 1360 may be multiplexed together on a single physical interface, such as the examples listed above.

Figure 14:
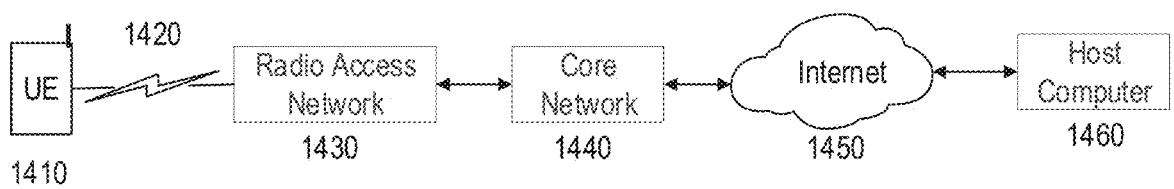
FIG. 14 illustrates a block diagram of an exemplary network configuration usable to provide over-the-top (OTT) data services between a host computer and a UE, according to one or more exemplary embodiments.

FIG. 14 is a block diagram of an exemplary network configuration usable to provide over-the-top (OTT) data services between a host computer and a user equipment (UE), according to one or more exemplary embodiments of the present disclosure. UE 1410 can communicate with radio access network (RAN) 1430 over radio interface 1420, which can be based on protocols described above including, e.g., LTE, LTE-A, and 5G/NR. RAN 1430 can include one or more network nodes (e.g., base stations, eNBs, gNBs, controllers, etc.). RAN 1430 can further communicate with core network 1440 according to various protocols and interfaces described above. For example, one or more apparatus (e.g., base stations, eNBs, gNBs, etc.) comprising RAN 1430 can communicate to core network 1440 via core network interface 1350 described above. In some exemplary embodiments, RAN 1430 and core network 1440 can be configured and/or arranged as shown in other figures discussed above. Similarly, UE 1410 can also be configured and/or arranged as shown in other figures discussed above.

Core network 1440 can further communicate with an external packet data network, illustrated in FIG. 14 as Internet 1450, according to various protocols and interfaces known to persons of ordinary skill in the art. Many other devices and/or networks can also connect to and communicate via Internet 1450, such as exemplary host computer 1460. In some exemplary embodiments, host computer 1460 can communicate with UE 1410 using Internet 1450, core network 1440, and RAN 1430 as intermediaries. Host computer 1460 can be a server (e.g., an application server) under ownership and/or control of a service provider. Host computer 1460 can be operated by the OTT service provider or by another entity on the service provider's behalf.

For example, host computer 1460 can provide an over-the-top (OTT) packet data service to UE 1410 using facilities of core network 1440 and RAN 1430, which can be unaware of the routing of an outgoing/incoming communication to/from host computer 1460. Similarly, host computer 1460 can be unaware of routing of a transmission from the host computer to the UE, e.g., the routing of the transmission through RAN 1430. Various OTT services can be provided using the exemplary configuration shown in FIG. 14 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 14 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide an efficient technique to signal a spatial relation for Physical Uplink Control Channel (PUCCH) resources (e.g., via a MAC-CE message) to be used by UE 1410 when communicating with a network node (e.g., gNB) comprising RAN 1430. For example, such techniques can flexibly signal whether a spatial relation should apply to a single PUCCH resource, or to a plurality of PUCCH resources, such as to all configured PUCCH resources or to a group, set, and/or subset of all configured PUCCH resources. When used in NR UEs (e.g., UE 1410) and gNBs (e.g., gNBs comprising RAN 1430) supporting PUCCH spatial relation functionality, such exemplary embodiments can provide various improvements, benefits, and/or advantages including reduced signaling overhead in both downlink and uplink; reduced delay in signaling PUCCH spatial relations for multiple resources; better support for decoupled uplink/downlink implementations; and reduced energy consumption for transmission and/or reception of PUCCH messages. As such, the improvements, as described herein, can play a critical role by enabling UE 1410 and RAN 1430 to meet the requirements of the particular OTT service between host computer 1460 and UE 1410. These techniques improve data throughput in a coverage area and enable a greater number of users to utilize data-intensive services such as streaming video in various coverage conditions without excessive power consumption or other degradations to user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources include symbols, time slots, mini-slots, subframes, radio frames, transmission time intervals (TTIs), interleaving times, time resource numbers, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for a network node to configure Physical Uplink Control Channel (PUCCH) resources usable in communication with a user equipment (UE) in a wireless communication network, the method comprising:
   sending, to the UE, one or more control messages comprising:
      configuration of a plurality of PUCCH resources; and
      identification of a plurality of spatial relations between the configured plurality of PUCCH resources and one or more reference signals (RS) transmitted by the network node or by the UE; and
   sending, to the UE, a further control message comprising:
      identification of a first spatial relation of the plurality of spatial relations; and
      an indication of whether the first spatial relation applies to a single PUCCH resource of the configured plurality of PUCCH resources or to at least one group of PUCCH resources, each of the at least one groups comprising at least a subset of the configured plurality of PUCCH resources.

2. The method of exemplary embodiment 1, wherein the further control message comprises a resource identifier, associated with the indication, that identifies one of:
   a particular single PUCCH resource to which the first spatial relation applies; and
   a particular group of PUCCH resources to which the first spatial relation applies.

3. The method of exemplary embodiment 2, further comprising: receiving, from the UE, a PUCCH message transmitted according to the first spatial relation using the particular single PUCCH resource, or a particular resource comprising the particular group of PUCCH resources, identified by the resource identifier.

4. The method of exemplary embodiment 1, wherein the further control message comprises a resource identifier, associated with the indication, that comprises one of:
   a first value indicating that the first spatial relation applies to the configured plurality of PUCCH resources; and
   a second value identifying a particular single PUCCH resource to which the first spatial relation applies.

5. The method of exemplary embodiment 1, wherein:
   the indication comprises a flag; and
   when the flag indicates that the first spatial relation applies to a single PUCCH resource, the further control message comprises an identifier of a particular single PUCCH resource, of the configured plurality of PUCCH resources, to which the first spatial relation applies.

6. The method of exemplary embodiment 1, wherein the one or more control messages further comprises identification of a plurality of groups of the configured plurality of PUCCH resources.

7. The method of exemplary embodiment 6, wherein when the indication indicates that the first spatial relation applies to at least one group of PUCCH resources, the further control message comprises an identifier of a particular group, of the plurality of groups of PUCCH resources, to which the first spatial relation applies.

8. The method of exemplary embodiment 6, wherein the one or more control messages identifies the plurality of groups, of the configured plurality of PUCCH resources, in relation to an operation other than spatial relations with the one or more reference signals.

9. The method of exemplary embodiment 6, wherein when the indication indicates that the first spatial relation applies to at least one group of PUCCH resources, the further control message comprises an identifier of a particular plurality of groups, of the plurality of groups of PUCCH resources, to which the first spatial relation applies.

10. The method of exemplary embodiment 6, wherein the plurality of groups comprises:
   a first group of PUCCH resources configured according to a first format; and
   a second group of PUCCH resources configured according to a second format different than the first format.

11. The method of exemplary embodiment 10, wherein the first group of PUCCH resources are configured to carry scheduling requests (SR) for uplink (UL) transmissions by the UE, and the second group of PUCCH resources are configured to carry at least feedback relating to downlink (DL) transmission by the network node.

12. The method of exemplary embodiment 6, further comprising: performing a training procedure, with the UE, to determine the plurality of spatial relations between the configured plurality of PUCCH resources and the one or more RS.

13. A method for a user equipment (UE) to configure Physical Uplink Control Channel (PUCCH) resources usable in communication with a network node in a wireless communication network, the method comprising:
   receiving, from the network node, one or more control messages comprising:
      configuration of a plurality of PUCCH resources; and
      identification of a plurality of spatial relations between the configured plurality of PUCCH resources and one or more reference signals (RS) transmitted by the network node or by the UE; and
   receiving, from the network node, a further control message comprising: identification of a first spatial relation of the plurality of spatial relations; and
   an indication of whether the first spatial relation applies to a single PUCCH resource of the configured plurality of PUCCH resources or to at least one group of PUCCH resources, each of the at least one groups comprising at least a subset of the configured plurality of PUCCH resources.

14. The method of exemplary embodiment 13, wherein the further control message comprises a resource identifier, associated with the indication, that identifies one of:
   a particular single PUCCH resource to which the first spatial relation applies; and
   a particular group of PUCCH resources to which the first spatial relation applies.

15. The method of exemplary embodiment 14, further comprising: transmitting a PUCCH message, to the network node, according to the first spatial relation and using the particular single PUCCH resource, or a particular resource comprising the particular group of PUCCH resources, identified by the resource identifier.

16. The method of exemplary embodiment 13, wherein the further control message comprises a resource identifier, associated with the indication, that comprises one of:
   a first value indicating that the first spatial relation applies to the configured plurality of PUCCH resources; and
   a second value identifying a particular single PUCCH resource to which the first spatial relation applies.

17. The method of exemplary embodiment 13, wherein:
   the indication comprises a flag; and
   when the flag indicates that the first spatial relation applies to a single PUCCH resource, the further control message comprises an identifier of a particular single PUCCH resource, of the configured plurality of PUCCH resources, to which the first spatial relation applies.

18. The method of exemplary embodiment 13, wherein the one or more control messages further comprises identification of a plurality of groups of the configured plurality of PUCCH resources.

19. The method of exemplary embodiment 18, wherein when the indication indicates that the first spatial relation applies to at least one group of PUCCH resources, the further control message comprises an identifier of a particular group, of the plurality of groups of PUCCH resources, to which the first spatial relation applies.

20. The method of exemplary embodiment 18, wherein the one or more control messages identifies the plurality of groups, of the configured plurality of PUCCH resources, in relation to an operation other than spatial relations with the one or more reference signals.

21. The method of exemplary embodiment 18, wherein when the indication indicates that the first spatial relation applies to at least one group of PUCCH resources, the further control message comprises an identifier of a particular plurality of groups, of the plurality of groups of PUCCH resources, to which the first spatial relation applies.

22. The method of exemplary embodiment 18, wherein the plurality of groups comprises:
   a first group of PUCCH resources configured according to a first format; and
   a second group of PUCCH resources configured according to a second format different than the first format.

23. The method of exemplary embodiment 22, wherein the first group of PUCCH resources are configured to carry scheduling requests (SR) for uplink (UL) transmissions by the UE, and the second group of PUCCH resources are configured to carry at least feedback relating to downlink (DL) transmission by the network node.

24. The method of exemplary embodiment 18, further comprising: performing a training procedure, with the network node, to determine the plurality of spatial relations between the configured plurality of PUCCH resources and the one or more RS.

25. A network node arranged to configure Physical Uplink Control Channel (PUCCH) resources usable in communication with a user equipment (UE) in a wireless communication network, the network node comprising:
   communication circuitry configured for communicating with one or more UEs; and processing circuitry operatively associated with the communication circuitry and configured to perform operations corresponding to the methods of any of exemplary embodiments 1-12.

26. A user equipment (UE) arranged to configure Physical Uplink Control Channel (PUCCH) resources usable in communication with a network node in a wireless communication network, the UE comprising:
communication circuitry configured for communicating with the network node; and
processing circuitry operatively associated with the communication circuitry and configured to perform operations corresponding to the methods of any of exemplary embodiments 13-24.

27. A non-transitory, computer readable medium storing computer-executable instructions that, when executed by at least one processor of a network node arranged to configure Physical Uplink Control Channel (PUCCH) resources usable in communication with a user equipment (UE), configure the network node to perform operations corresponding to the methods of any of exemplary embodiments 1-12.

28. A non-transitory, computer readable medium storing computer-executable instructions that, when executed by at least one processor of a user equipment (UE) arranged to configure Physical Uplink Control Channel (PUCCH) resources usable in communication with a network node, configure the UE to perform operations corresponding to the methods of any of exemplary embodiments 13-24.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms can be employed herein, they are used in a generic and descriptive sense only and not for purposes of limitation.

The invention claimed is:

1. A method for receiving, by a network node in a wireless communication network, Physical Uplink Control Channel (PUCCH) transmissions by a user equipment (UE), the method comprising:
sending, to the UE, a configuration message mapping a plurality of PUCCH resources configured for the UE to one or more groups of PUCCH resources;
sending, to the UE, a control message comprising:
identification of a first spatial relation of a plurality of spatial relations configured for the UE, wherein the plurality of spatial relations are associated with one or more reference signals (RS) transmitted by the network node or by the UE; and
a resource identifier identifying one of the one or more groups of PUCCH resources, the identified group of PUCCH resources being the group of PUCCH resources to which the first spatial relation applies; and
receiving, from the UE, a PUCCH message transmitted according to the first spatial relation using a PUCCH resource from the identified group of PUCCH resources.

2. The method of claim 1, further comprising sending, to the UE:
a configuration of the plurality of PUCCH resources, and
a configuration of the plurality of spatial relations.

3. The method of claim 1, wherein the resource identifier has one of a plurality of values, each of the values identifying a particular group of the one or more groups of PUCCH resources.

4. A non-transitory, computer readable medium storing computer-executable instructions that, when executed by at least one processor of a network node arranged to receive Physical Uplink Control Channel (PUCCH) transmissions by a user equipment (UE) in a wireless communication network, configure the network node to perform operations corresponding to the method of claim 1.

5. A network node arranged to receive Physical Uplink Control Channel (PUCCH) transmissions by a user equipment (UE) in a wireless communication network, the network node comprising:
a radio network interface configured for communicating with the UE; and
processing circuitry operatively coupled to the radio network interface, whereby the processing circuitry and the radio network interface are configured to:
send, to the UE, a configuration message mapping a plurality of PUCCH resources configured for the UE to one or more groups of PUCCH resources;
send, to the UE, a control message comprising:
identification of a first spatial relation of a plurality of spatial relations configured for the UE, wherein the plurality of spatial relations are associated with one or more reference signals (RS) transmitted by the network node or by the UE; and
a resource identifier identifying one of the one or more groups of PUCCH resources, the identified group of PUCCH resources being the group of PUCCH resources to which the first spatial relation applies; and
receive, from the UE, a PUCCH message transmitted according to the first spatial relation using a PUCCH resource from the identified group of PUCCH resources.

6. The network node of claim 5, wherein the processing circuitry and the radio network interface are further configured to send, to the UE:
a configuration of the plurality of PUCCH resources, and
a configuration of the plurality of spatial relations.

7. The network node of claim 5, wherein the resource identifier has one of a plurality of values, each of the values identifying a particular group of the one or more groups of PUCCH resources.

8. A method for Physical Uplink Control Channel (PUCCH) transmission by a user equipment (UE) in a wireless communication network, the method comprising:
receiving, from a network node in the wireless communication network, a configuration message mapping a plurality of PUCCH resources configured for the UE to one or more groups of PUCCH resources;
receiving, from the network node, a control message comprising:
identification of a first spatial relation of a plurality of spatial relations configured for the UE, wherein the plurality of spatial relations are associated with one or more reference signals (RS) transmitted by the network node or by the UE; and
a resource identifier identifying one of the one or more groups of PUCCH resources, the identified group of PUCCH resources being the group of PUCCH resources to which the first spatial relation applies; and transmitting, to the network node according to the first spatial relation, a PUCCH message using a PUCCH resource from the identified group of PUCCH resources.

9. The method of claim 8, further comprising receiving, from the network node:
   a configuration of the plurality of PUCCH resources, and
   a configuration of the plurality of spatial relations.

10. The method of claim 8, wherein the resource identifier has one of a plurality of values, each of the values identifying a particular group of the one or more groups of PUCCH resources.

11. A user equipment (UE) configured to transmit on a Physical Uplink Control Channel (PUCCH) in a wireless communication network, the UE comprising:
   a radio transceiver configured for communicating with a network node in the wireless communication network; and
   processing circuitry operatively coupled to the radio transceiver, whereby the processing circuitry and the radio transceiver are configured to perform operations corresponding to the method of claim 8.

12. The UE of claim 11, wherein the processing circuitry and the radio transceiver are further configured to receive, from the network node:
   a configuration of the plurality of PUCCH resources, and
   a configuration of the plurality of spatial relations.

13. The UE of claim 11, wherein the resource identifier has one of a plurality of values, each of the values identifying a particular group of the one or more groups of PUCCH resources.

14. A non-transitory, computer readable medium storing computer-executable instructions that, when executed by at least one processor of a user equipment (UE) configured to transmit on a Physical Uplink Control Channel (PUCCH) in a wireless communication network, configure the UE to perform operations corresponding to the method of claim 8.

* * * * *

UNITED STATES PATENT AND TRADEMARK OFFICE
CERTIFICATE OF CORRECTION

| | | |
|---|---|---|
| PATENT NO. | : 11,095,344 B2 | |
| APPLICATION NO. | : 17/002153 | |
| DATED | : August 17, 2021 | |
| INVENTOR(S) | : Grant et al. | |

It is certified that error appears in the above-identified patent and that said Letters Patent is hereby corrected as shown below:

In the Specification

In Column 1, Line 10, delete "2019," and insert -- 2019, now Pat. No. 10,790,882, --, therefor.

In Column 13, Lines 27-39, delete "According . . . . GROUP ID." and insert the same at Line 28, as a new Paragraph.

In Column 14, Line 32, delete "FIG. 1" and insert -- FIG. 7 --, therefor.

In Column 19, Lines 61-62, delete "host interface 1260." and insert -- control interface 1260. --, therefor.

In Column 20, Line 10, delete "host interface 1260." and insert -- control interface 1260. --, therefor.

In Column 26, Line 50, delete "laptop embedded equipped (LEE)," and insert -- laptop embedded equipment (LEE), --, therefor.

Signed and Sealed this
Nineteenth Day of April, 2022

Katherine Kelly Vidal
*Director of the United States Patent and Trademark Office*